United States Patent [19]

Hagedorn

[11] Patent Number: 4,930,153

[45] Date of Patent: May 29, 1990

[54] PBX VOICE MAIL INTERFACE

[75] Inventor: Guenter E. Hagedorn, Minnetonka, Minn.

[73] Assignee: Nicollet Technologies, Inc., Eden Prairie, Minn.

[21] Appl. No.: 338,514

[22] Filed: Apr. 7, 1989

Related U.S. Application Data

[63] Continuation of Ser. No. 169,964, Mar. 18, 1988, abandoned.

[51] Int. Cl.⁵ .................. H04M 3/50; H04M 7/14
[52] U.S. Cl. ................................. 379/233; 379/89; 379/235; 379/240
[58] Field of Search ............... 379/233, 213, 235, 231, 379/88, 67, 84, 211, 89, 240

[56] References Cited

U.S. PATENT DOCUMENTS

| | | | |
|---|---|---|---|
| 4,076,965 | 2/1978 | Olsen et al. | 379/282 |
| 4,254,304 | 3/1981 | Fulghum et al. | 379/98 |
| 4,629,831 | 12/1986 | Curtin et al. | 379/213 |
| 4,636,584 | 1/1987 | Binkerd et al. | 379/240 |
| 4,696,028 | 9/1987 | Morganstein et al. | 379/88 |
| 4,792,967 | 12/1988 | Ladd et al. | 379/67 |
| 4,811,381 | 3/1989 | Woo et al. | 379/67 |

OTHER PUBLICATIONS

"Patent Covers PBX-Integrated Call Routing", *Voice News*, Mar. 1989.

*Primary Examiner*—Thomas W. Brown
*Attorney, Agent, or Firm*—Merchant, Gould, Smith, Edell, Welter & Schmidt

[57] ABSTRACT

An interface is described which attaches between the incoming trunk lines from a central office and a PBX system and which monitors the communication between the central office and the PBX to record the signals representative of telephone extension of a called party for later downloading to telephone peripheral equipment attached to the PBX, such as voice mail systems. The interface passively monitors the line during handshake communication between the central office and the PBX and receives the digits of the dialed extension and stores them in memory. The interface then monitors the line for a request to send from the peripheral equipment attached to the PBX. When the request is received, the interface assumes supervision of the telephone line by terminating the line to the central office and the line to the PBX. The interface then downloads the digits of the dialed extension to the telephone peripheral equipment, such as a voice mail system, for identifying the extension to which the message belongs. Two embodiments of the present invention are described in which the interface can operate with either DID trunk lines attached to a PBX system or with POTS (Plain Old Telephone Service) lines attached to a PBX.

1 Claim, 8 Drawing Sheets

FIG. 7
(PRIOR ART)
WINK PROTOCOL

PBX VOICE MAIL INTERFACE

This is a continuation of application Ser. No. 169,964 filed Mar. 18, 1988 now abandoned.

FIELD OF THE INVENTION

The present invention relates to the field of PBX technology and in particular to PBX-to-central office interface systems for DID (direct INWARD dialing) lines or POTS (Plain Old Telephone Service) lines to support voice mail systems and the like.

DESCRIPTION OF THE PRIOR ART

The present invention is directed toward the marriage of two telephone technologies, namely, PBX (private branch telephone exchange) and voice mail systems. Voice mail, as is understood in the art, is an automatic answering and message-taking apparatus which allows a caller to leave a stored message for a specific telephone extension or intended recipient. The voice mail system is typically invoked when a caller directly dials a specific extension or requests to be connected to a specific extension which is found to be busy, inoperative, nonanswering, etc. At this juncture the call is routed to a voice mail receiving station in which a stored voice or telephone operator receives the call and prompts the caller to leave a stored message.

In PBX environments, a common voice mail receiving station is typically connected to receive calls from the entire PBX system. In some applications this structure results in a bothersome problem for users of the voice mail answering service. This is caused by the timing of the invocation of the voice mail system after the incoming call has been routed to it from another extension. By the time the call is routed to the voice mail answering service, the identity of the called extension is lost. Although the PBX system originally received the extension digits on the incoming call, by the time the call is routed to the voice mail system the digits are lost. In this event, the voice mail answering service must ask the caller for the extension that the caller originally dialed, or ask for the identity of the called party. This is particularly troublesome in the application of modern voice mail systems to older PBX systems.

SUMMARY OF THE INVENTION

The present invention solves the aforementioned problems and other problems that will be recognized by those skilled in the art upon reading and understanding the present specification. The present invention is directed toward capturing incoming extension addresses on one-way trunks for direct inward dial (DID) trunks or PBX-generated addresses for POTS (Plain Old Telephone Service) lines in PBX environments. POTS lines typically require operator direction of the incoming call. DID lines permit an outside subscriber to dial directly to an in-house extension without operator assistance (this technique helps prevent traffic congestion at the switchboard). Both DID PBX and POTS PBX systems cause problems for voice mail systems which need to know the identity of the extension dialed.

The present invention is directed toward capturing and saving in memory the address extension or complete telephone number of the called telephone on a DID or POTS network for later downloading to a voice mail system. When a voice mail system is invoked, it can request via DTMF signaling that the present invention download the telephone address of the incoming call so that the caller need not re-identify the party called. The present invention is applicable to either DTMF or dial pulse PBX environments. The telephone address is downloaded to the voice mail system in DTMF signaling regardless of the type of incoming signaling on the DID network.

BRIEF DESCRIPTION OF THE DRAWINGS

In the drawings, where like numerals refer to like components throughout the several views.

DETAILED DESCRIPTION OF THE PREFERRED EMBODIMENT

In the detailed description of the preferred embodiments, reference is made to the accompanying drawings which form a part hereof, and in which is shown by way of illustration specific embodiments in which the invention may be practiced. The embodiments are described in sufficient detail to enable those skilled in the art to practice the invention, and it is to be understood that other embodiments may be utilized and that structural or electrical changes may be made without departing from the spirit and scope of the present invention. The following detailed description is, therefore, not to be taken in a limiting sense, and the scope of the present invention is defined by the appended claims.

The preferred embodiment of the present invention is an apparatus for connection to the telephone lines of a PBX system which monitors the lines and stores the digits of the called extension for later downloading to a voice mail system all transparent to the caller. Two embodiments of the present invention are described. The first embodiment, hereinafter referred to as the DID PBX Interface, is designed to operate as a monitor/interface between DID trunk lines (using wink start or immediate start) and DID PBX systems in which the battery voltage for the trunk line is sourced by the PBX. The second embodiment of the present invention, hereinafter referred to as the POTS PBX Interface, is designed to operate as a monitor/interface between POTS lines and POTS PBX systems in which the talk battery is sourced by the central office. Both these implementations of the present invention respond to a request by a voice mail system to download the extension of the called party. In the case of the DID PBX systems, the extension is received from the DID trunk line. In the case of the POTS PBX systems, the extension is received from the POTS PBX and stored in the interface for later downloading to the voice mail system.

For purpose of a better understanding of the handshake protocol used in DID PBX systems, a brief description of the DID lines is included here. PBX systems using DID and DOD (direct output dialing) lines allow disproportionate ratios of DID to DOD lines so that, for example, a business may handle a large number of incoming calls while only needing a small number of output lines to handle outgoing calls. The DID lines are unassigned until an incoming call to the PBX is routed by the central office. One of the plurality of DID lines is selected by the central office and the call is routed to the PBX. The trunk signaling between the central office and the PBX on the DID lines most often used is loop reverse-battery-wink, more commonly called wink start protocol. Less common is immediate start.

Figure 7:
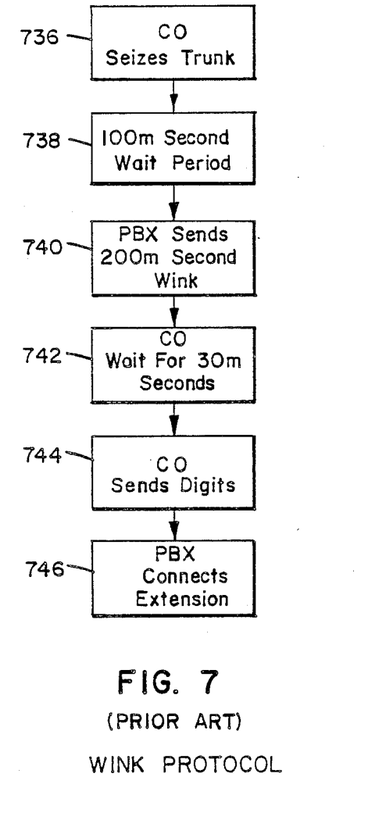
FIG. 7 is a flowchart of the prior art handshake protocol for a wink start PBX system.

Referring briefly to FIG. 7, the prior art description of the wink start protocol is described. The central office seizes one of the DID trunk lines 736 by placing a DC load impedance across the trunk line. Since the PBX sources the talk battery voltage, a current loop is created between the tip and ring wires of the trunk line. The current flowing through this loop is immediately sensed by the PBX. After an approximate 100-millisecond wait period 738, the PBX sends an approximate 200-millisecond (179-290 mSec) wink 740 in the form of reversing the battery voltage between the tip and ring wires of the trunk line. This signals the central office that the PBX is ready to receive the in-house extension for the incoming call. After sensing the 200-millisecond wink, the central office waits for an additional 30 milliseconds after the wink has completed 742. The central office then sends the digits for the in-house extension 744 and the PBX connects the trunk line to the appropriate extension 746. This completes the call.

In the foregoing description of the handshaking between the central office and the PBX, it can be seen that the extension of the called party is transmitted by the central office only once and the PBX connects the extension after receiving the digits. The vast majority of PBX's currently available on the market do not store the incoming digits, but rather use them directly to make the connection. The extension number of the party called is then immediately discarded by the PBX since the design of these PBS's recognizes no further need to store these digits.

The application of voice mail systems to the aforementioned types of PBX systems operates as follows. When an incoming call is directed by the PBX to an extension, the extension is either answered or directed to a voice mail system for automatic answering. When the call is directed to a voice mail system, the voice mail system is unaware of the extension number of the called party to which the DID trunk was connected. Thus, when the voice mail system is invoked, the voice mail device must query the caller as to the extension number of the called party. This is a cumbersome method of identifying the called party for the voice mail system, which has heretofore been unaddressed in the prior art.

For purposes of a better understanding of the handshake protocol used in POTS PBX systems, a brief description of the POTS protocol is included here. The POTS lines from the central office have the talk battery sourced by the central office and the current loop is established by having the POTS PBX system merely place termination impedance across the line, indicating an off-hook condition. The call is typically routed to a switchboard where an operator answers the call and requests direction of the call. The operator then routes the call by inputting the extension of the called party, and the call is completed. If once the call is routed to the called party's telephone equipment and the call is not answered, the PBX system will automatically transfer the call to another extension assigned to the voice mail system. By the time the call is routed to the voice mail system in a POTS PBX environment, the extension number of the called party is no longer available to the voice mail system. Thus, once again the voice mail device must query the caller as to the extension number of the called party.

Figure 1:
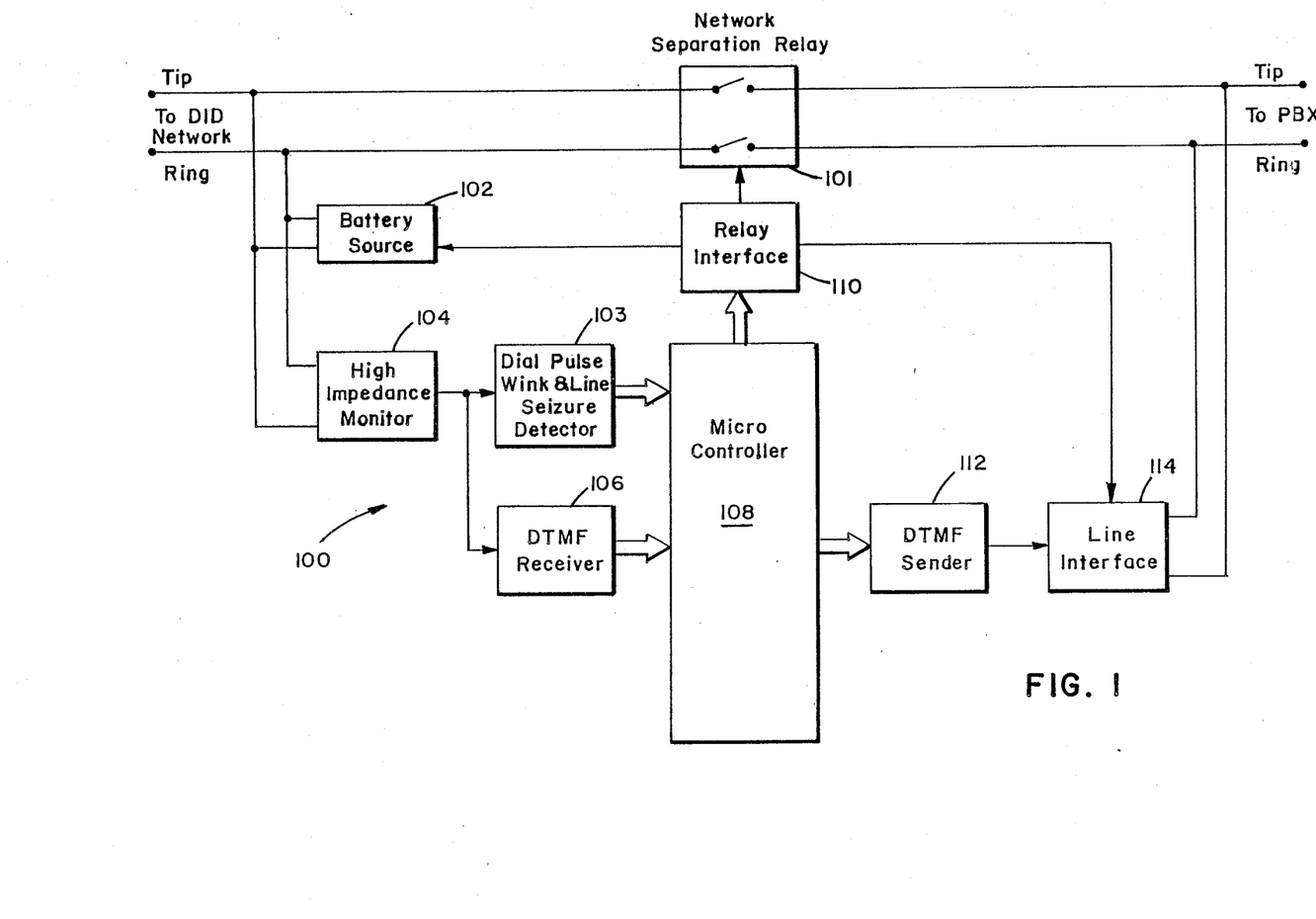
FIG. 1 is a block diagram of a DID PBX Interface System.

Referring to FIG. 1, the first preferred embodiment of the present invention (DID PBX Interface) 100 is described. To the left of FIG. 1 is the incoming DID trunk line from the central office with the standard labeling of the wires as the tip and the ring line pair. A network separation relay 101 separates the incoming DID trunk from the PBX and is controlled by the microcontroller 108 through the relay interface 110. The network separation relay 101 is normally closed, allowing trunk signaling and voice communication between the central office and the PBX. The network separation relay 101 is opened during downloading and communication between the present invention 100 and the voice mail system. When the network separation relay is opened, the battery source 102 supplies the battery voltage to keep the trunk line active from the central office while the line interface 114 maintains a termination impedance to keep the line actively terminated from the PBX. After the downloading is complete, the network separation relay 101 recloses, the battery source voltage is removed from battery source 102 and the termination impedance in the line interface 114 is removed. The telephone call can then be cut through for voice communication.

The embodiment of the present invention of FIG. 1 is designed to recognize the ongoing hand-shake communication between the central office and the PBX to recognize the timing protocol in order to capture the digits of the dialed extension when they are transmitted from the central office. The embodiment of FIG. 1 is designed to operate in either dial pulse environments or DTMF environments. Thus, a pulse dial PBX network on pulse dial lines may be connected to a voice mail system operable only with DTMF signaling, since the invention of FIG. 1 is capable of receiving dial pulse digits and converting them to DTMF digits for downloading to the voice mail system. Thus, regardless of the type of dialing protocol used (dial pulse MF or DTMF), the present invention will translate dial pulse signaling to DTMF signaling for the voice mail system. In addition to the above, the MF (multi-frequency) standard of tone signaling could be added or substituted for DTMF signaling, although not shown in FIG. 1.

The microcontroller 108 along with its internally stored software control program controls the operation of the DID PBX interface. The digits of the extension transmitted from the central office down the DID trunk line are received by the PBX and simultaneously received by the microcontroller of the present invention. The high impedance monitor 104 is used to DC isolate the detection circuitry and receiving circuitry 103 and 106 respectively of the present invention to receive the signaling without interfering with the operation of the PBX. The DTMF receiver 106 will recognize the dual tone multifrequency (DTMF) tone pairs transmitted by the central office and will translate them into digital values for storage by microcontroller 108. If dial pulse signaling is used, the dial pulse wink and line seizure detector 103 will translate the dial pulses into the same format of digital codes representing the extension dialed for storage into microcontroller 108. Circuit 103 also recognizes the wink and line seizure communication protocol between the central office and the PBX, allowing microcontroller 108 to recognize when the information will become available on the DID lines.

Relay interface 110 controls the battery source circuit 102, the network separation relay circuit 101, termination impedance circuit 105, and the line interface circuit 114, all of which contain solid state relays for controlling the operation of the present invention. For example, the battery source circuit 102 contains solid state relays which place the battery source across the tip and ring wires of the DID trunk when the network separation relay is opened. In a like fashion, the line interface 114 contains solid state relays which place a termination impedance across the tip and ring wires of the PBX line to appropriately terminate and hold the line while the network separation relay 101 is open. Network separation relay 100 also contains solid state relays which are used for cutting through the line for communication.

DTMF sender 112 is directly controlled by microcontroller 108 for transmitting to the voice mail system the stored telephone extension of the number addressed from the central office. The tones are transmitted only in DTMF tone pairs through the line interface 114 to the voice mail system upon request by the voice mail device. The request and response protocol is described below.

Figure 2:
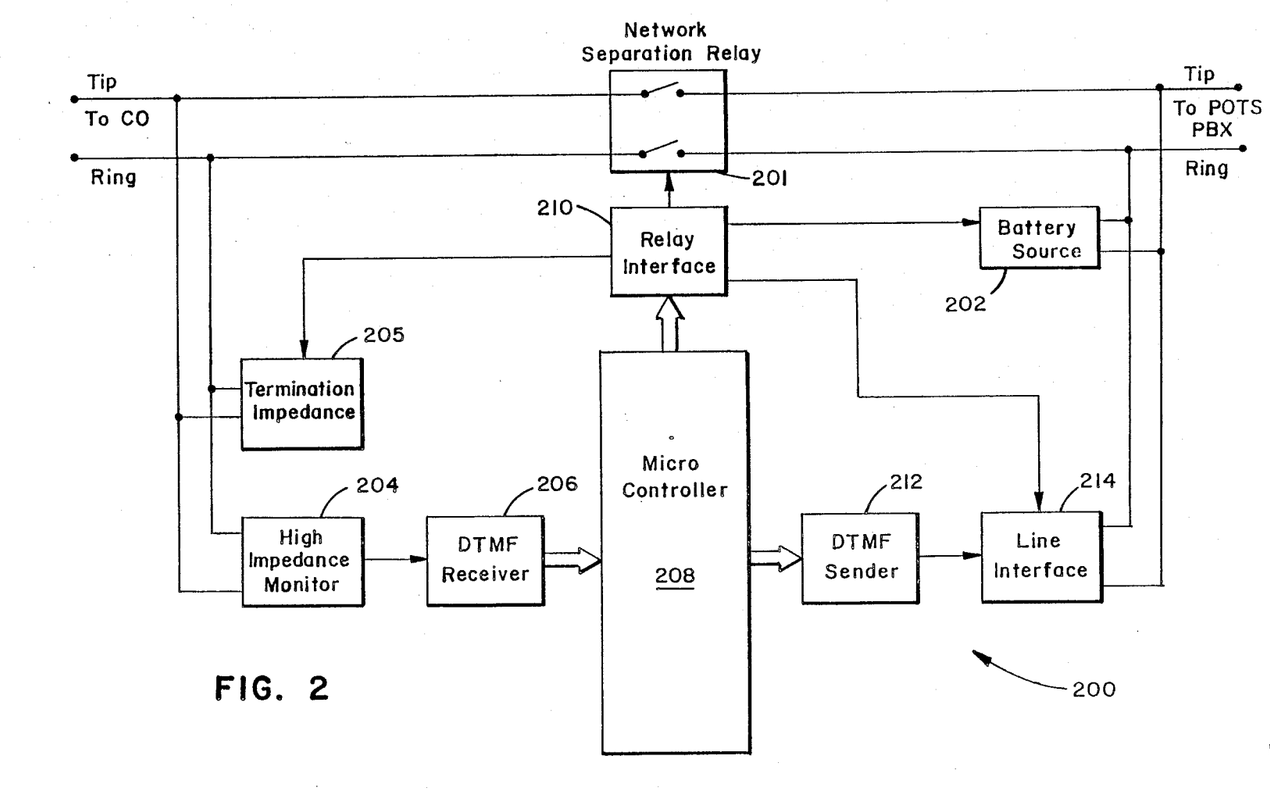
FIG. 2 is a block diagram of a POTS PBX Interface System.

Referring to FIG. 2, the second preferred embodiment of the present invention (POTS PBX Interface) 200 is described. In this application, a voice mail system is attached to a POTS PBX system in which standard lines from the central office are connected to the POTS PBX system. In this system the central office sources battery voltage and the POTS PBX system merely terminate the line with the typical 300-ohm line termination. The incoming call is typically directed by an in-house switchboard operator to the correct extension. Thus, no dial pulse or DTMF digits are transmitted down the line from the central office to the PBX. In this system, the PBX is temporarily aware of the extension number of the called telephone (inputted by the switchboard operator) and is capable of transmitting the extension number to the POTS PBX Interface 200 of FIG. 2. Thus, at the time the call is routed by the operator, the POTS PBX system will transmit to the present invention the extension number of the called party, which is then stored for later retransmission to the voice mail system upon request. In this situation, the present invention is adaptable to older-style PBX systems to which modernstyled voice mail systems are connected.

Network separation relay 201 is also a solid state relay controlled from the relay interface 210. Network separation relay 201 is normally closed to allow signaling and communication between the central office and the POTS PBX system. Network separation relay 201 is opened under control from microcontroller 208 when signaling is desired between the POTS PBX system and the POTS PBX Interface 200 or between the voice mail system and the POTS PBX Interface 200. When the network separation relay is opened for communication between the interface 200 and the PBX side of the line, the battery voltage normally sourced from the central office is cut off and must therefore be sourced by the battery source 202 to keep the line active. In a like fashion the relay interface causes a 300-ohm termination impedance 203 to be placed across the tip and ring wires of the central office telephone line to keep that side of the line active. The high impedance monitor 204 allows DTMF receiver 206 to receive DTMF signaling codes from the POTS PBX system for storage into microcontroller 208. Upon receipt of a request in the form of a DTMF request code from the voice mail sytem, the microcontroller will invoke the DTMF sender 212 to transmit through the line interface 214 the extension of the party dialed.

Figure 3A:
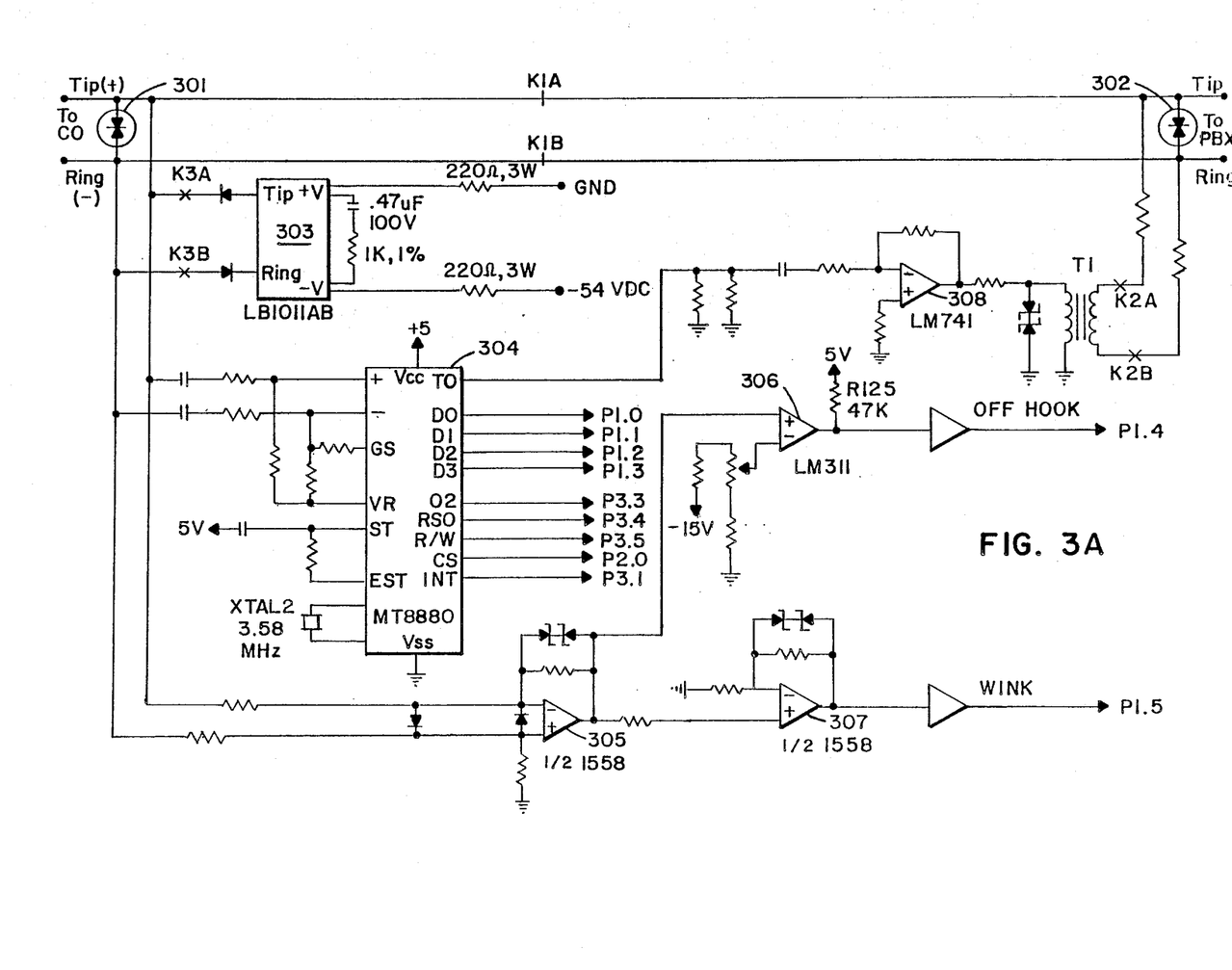
FIGS. 3A-3C are detailed electrical schematic diagrams of the DID PBX Interface System.
Figure 3B:
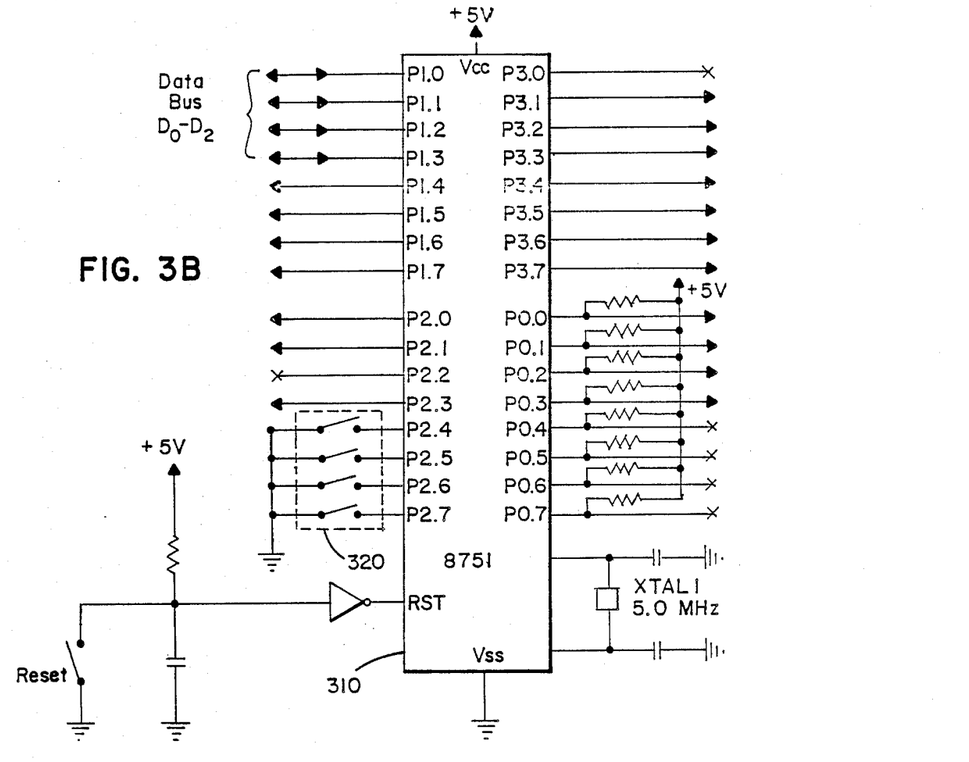
Figure 3C:
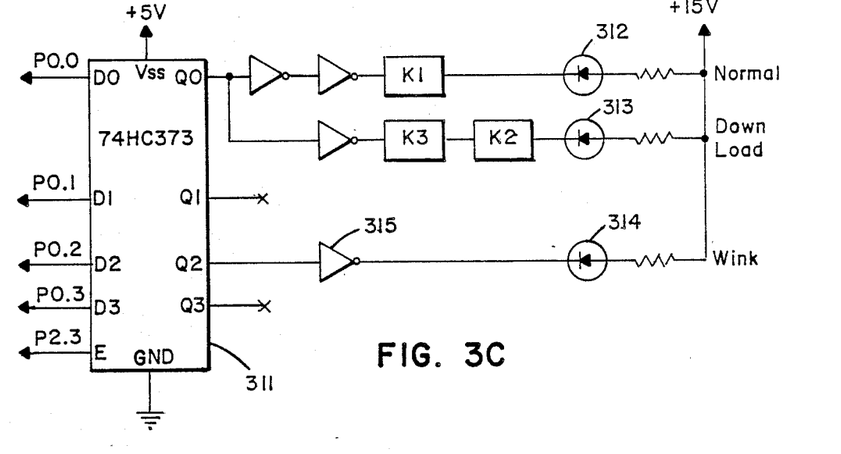

The detailed electrical schematic diagrams of the interface 100 of FIG. 1 is shown in FIGS. 3A–3C. The tip (+) and ring (−) lines of the DID trunk to the central office are shown to the left of FIG. 3A, while the tip and ring connections to the PBX are shown to the right. The relay contacts for the normally closed network separation relay are labeled K1A and K1B. The relay conventions used in the schematic diagrams for the present invention are the same standard conventions used throughout the telephone industry. Thus, the relay contacts K3A and K3B for the voltage source and the relay contacts K2A and K2B for the line interface are all shown in their normally open positions. The relays used in the present invention are solid state relays with optically isolated control lines, Part No. LH1056 available from AT&T and commonly used in the telephone industry. These solid state relays offer nearly zero crosstalk between the control lines and the relay contacts while offering very low contact impedance. Those skilled in the art will readily recognize that electromechanical and other types of relays could be used throughout the present invention. The relays chosen in the preferred embodiment of the present invention are designed to handle an extremely high number of closings without degradation in performance.

The voltage source for supplying the DID trunk line when the network interface relay is open is supplied from battery feed source integrated circuit 303, Part No. LB1011AB available from AT&T. This integrated circuit 303 is preferred due to its ability to source DC currents to a telephone line with minimal loading on the AC signals and its ability to suppress undesirable common-mode signals. This battery feed source integrated circuit 303 is supplied from an external −54DC source, resulting in approximately −48V across tip and ring, and is connected according to manufacturer's specifications. Those skilled in the art will readily recognize the techniques for utilizing this battery source or substituting equivalent alternate methods of generating the battery line feed.

The DTMF transceiver chip 304 shown in FIG. 3A is Part No. MT8880 available from Mitel Corporation and serves as both the DTMF receiver 106 and DTMF sender 112. This commonly available integrated circuit part is used throughout the telephone industry for transmitting and receiving DTMF tone pairs and translating them into a four-digit binary code available on bus lines D0-D3. This bus is attached to the microcontroller chip 310 shown in FIG. 3B through port number 1, lines 0—3. The microcontroller receives and transmits the binary codes corresponding to the DTMF codes for communication with the Mitel transceiver 304. The Mitel transceiver is controlled by a 3.58-mHz crystal for accurate tone reception and transmittion according to Telco standards. The chip is shown implemented according to manufacturer's specifications available from Mitel. The READ/WRITE, CHIP SELECT and other control lines are also interfaced to the microcontroller chip 310 through various I/O ports of the microcontroller chip as shown in FIG. 3B. The DTMF tones are received from the tip and ring lines of the DID line through DC blocking capacitors. The tones are decoded and the binary values are placed in the data bus for storage by the microcontroller.

The Mitel DTMF transceiver 304 also transmits DTMF tones out the $T_0$ line. These transmitted tones are used to download the extension of the called party to the voice mail system. The transmitted tones are buffered by operational amplifier 305 (part No. LM741 available from National Semiconductor and other vendors) through impedance matching transformer T1 onto the tip and ring wires to the PBX. Relay contacts K2A and K2B connect the impedance matching transformer T1 to the tip and ring wires of the PBX line during transmission of the extension from the present invention.

The preferred embodiment of the present invention is also capable of receiving the dialed extension using dial pulse signaling. The circuitry shown on the lower part of FIG. 3A and to the lower right is used for detecting off-hook condition, the reverse-batterywink signal from the PBX to the central office, and for detecting dial pulse signaling. Operational amplifier 305 (part No. LM1558 available from National Semiconductor and other vendors) voltage limits and buffers the incoming voltage switching signals. Comparator 306 (part No. LM311 available from National Semiconductor and other vendors) forms the part of a threshold detect circuit which detects the off-hook voltage condition for the microcontroller chip 310. The pulsing of voltage between the tip and ring wires from the central office indicative of dial pulse signaling is also detected by the threshold detector and comparator 306 and is also sensed through the same port on the microcontroller chip as that of the off-hook signal.

Operational amplifier 301 (part No. LM1558) senses the reverse polarity of the voltage on the tip and ring wires as buffered by the differential mode operation of operational amplifier 305 and indicates this condition to the microcontroller chip 310 through port P1.5.

The microcontroller chip 310 used in the preferred embodiment of the present invention is an Intel 8751 single chip 8-bit microcomputer with onboard EPROM program memory and RAM scratchpad memory. The architecture of this microcontroller includes four 7-bit I/O ports which are wired in the preferred embodiment to control the operation of the interface 100. In the preferred embodiment of the present invention shown, not all the ports are used, as seen on FIG. 3B. There are enough ports available on the microcontroller to support two channels in the preferred embodiment of the present invention by merely duplicating all of the logic and electrical functions found on FIG. 3A and connecting the port connections of FIG. 3A to alternate ports on the microcontroller. The microcontroller would be therefore capable of controlling two separate channels or two DID trunk lines. Ports P2.4 through P2.7 are shown connected to a DIP switch bank 320 which can be set to control optional operational functions of the interface such as wink start or immediate start, number of extension digits, etc.

Those skilled in the art will readily recognize that the preferred embodiment of the present invention may utilize a wide variety of alternate control structures without departing from the scope and spirit of the present invention. For example, a wide variety of microcontrollers or microprocessors, whether they be single-chip or multi-chip implementations, may be substituted for the microcontroller of the preferred embodiment. In a like fashion, hard-wired control or microprogram control could be substituted. In addition to this, the control functions of the present invention could be implemented by ROM-based control or PLA-based control.

The microcontroller chip 310 indirectly controls the solid state relays of the DID PBX interface device shown in FIG. 3C. A portion of an octal D-type latch 311 is used under microcontroller control to latch the control signals from the I/O port P0.0 to the relay control devices. For example, port P0.0, having a lowinactive output signal, will cause a current to flow through the relay control circuit K1, keeping the network interface relay contacts K1A and K1B normally closed. In addition, the optional LED indicator 312 will light, indicating that the network interface relay K1 is in a closed condition. When the output port P0.0 from the microcontroller goes high-active, relay control circuits K2 and K3 will be energized and relay control circuit K1 will be de-energized. This will cause the network interface relay K1 to open, the voltage source relay contacts K3A and K3B to close, and the line interface relay contacts K2A and K2B to close. The optional LED indicator 313 will light to show the activation of the relay control circuits K2 and K3, indicating the download position of the relay contacts allowing the DID PBX interface to download the dialed extension to the voice mail system.

Output port P0.2 can be used to indicate through an optional LED 314 whether the wink condition was sensed by the microprocessor (it is illuminated for the duration of the wink). This output port is buffered through the D-type latches 311 and the inverter buffer circuit 315 to light LED 314.

The DID PBX interface of the present invention may be implemented in a dual channel device by connecting port P0.1 to one of the octal D-type latch circuits of chip 311 and providing identical solid state relay control circuits to the outputs of this latch for the second channel as is provided for the first channel connected through port P0.0. In this fashion, the microcontroller 310 can control a second channel identical to the first.

Figure 4A:
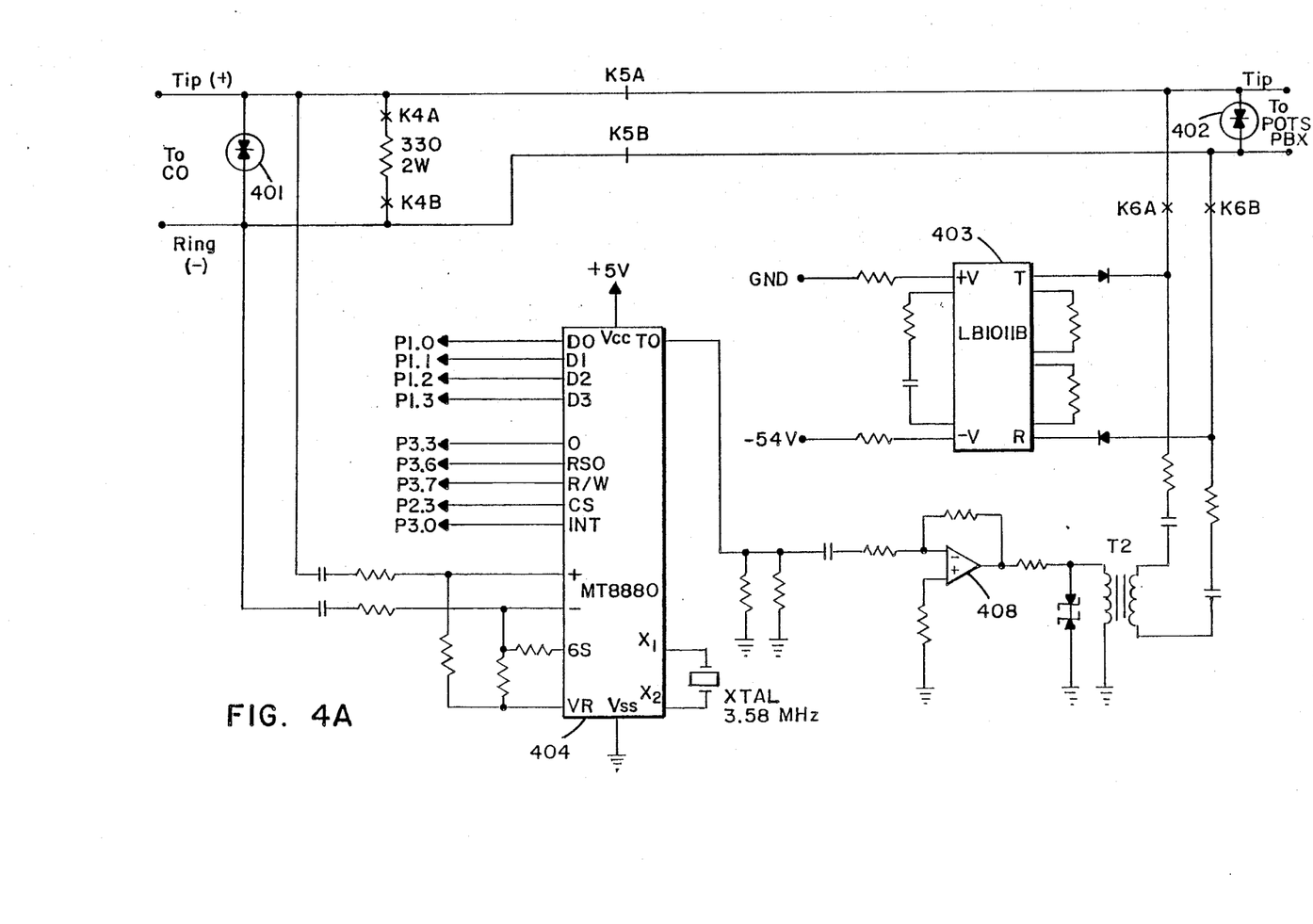
FIGS. 4A-4C are detailed electrical schematic diagrams of the POTS PBX Interface System.
Figure 4B:
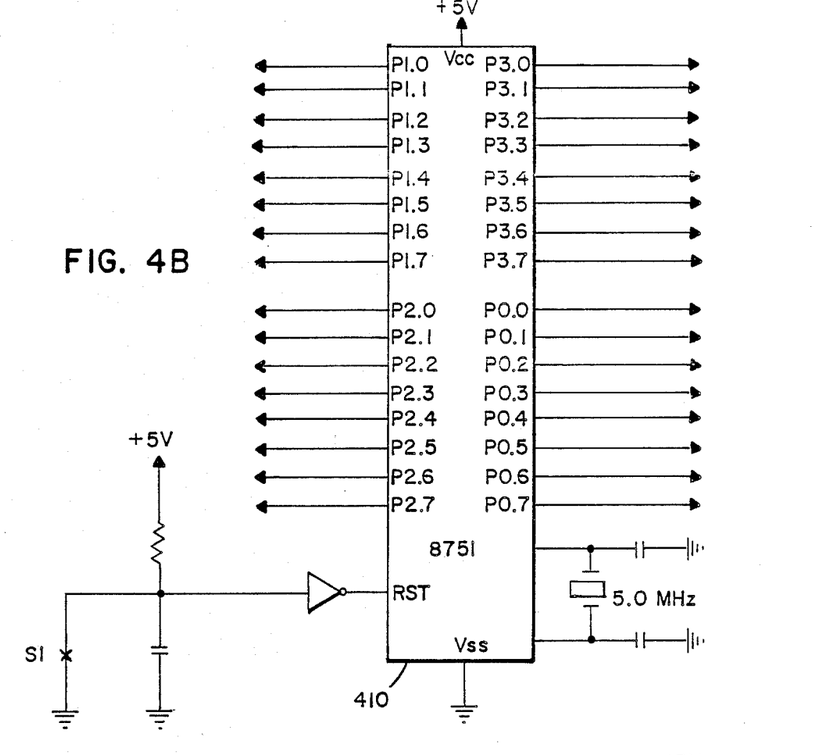
Figure 4C:
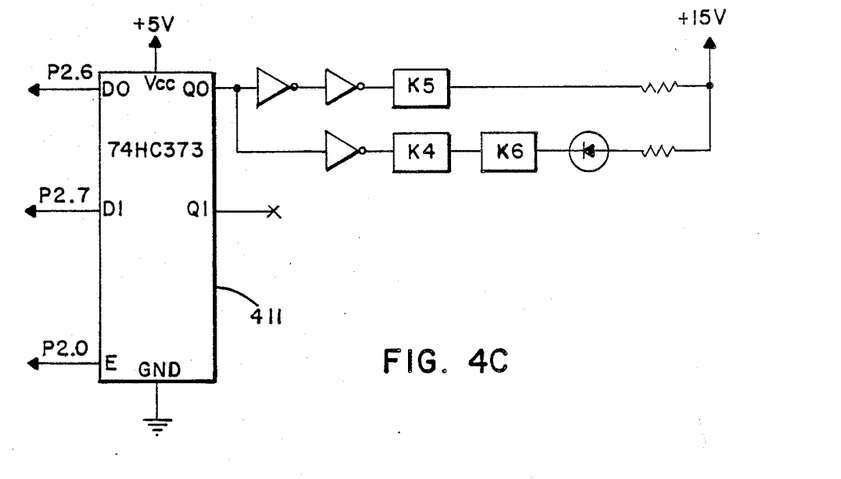

Referring to FIGS. 4A and 4C, the POTS PBX interface 200 will be described. This interface is implemented in a very similar fashion to that of the DID PBX interface 100 and can be easily understood by keeping in mind that in a DID PBX environment the central office sources a termination impedance while the DID PBX system sources a talk battery. In a POTS PBX system the roles are reversed in that the central office sources the talk battery while the POTS PBX system merely places a fixed impedance across the line to close the loop. Thus, in the POTS PBX interface 200 of FIGS. 4A-4C, the battery source is placed on the POTS PBX system side of the line and a line termination impedance is placed under relay control on the central office side of the line. Thus, normally open relay contacts K4A and K4B serve to terminate the line from the central office with a 330-ohm termination impedance. The line interface contacts K5A and K5B serve to cut through the central office to the POTS PBX system for communication. As in the DID PBX interface, the POTS PBX interface has overvoltage spike protection 401, 402 on both the central office side and the POTS PBX side.

When the network interface relay contacts K5A and K5B are opened, the termination impedance is connected through relay contacts K4A and K4B to the central office and the source battery voltage is connected to the POTS PBX system through relay contacts K6A and K6B. During this condition, the POTS PBX interface 200 is capable of downloading the telephone extension of the called party to the voice mail system.

In a fashion similar to that of the DID PBX interface 100, the POTS PBX interface 200 is controlled by microcontroller chip 410. This microcontroller is in the preferred embodiment identical to the Intel 8751 8-bit microcontroller of the DID PBX interface in that it is a complete 8-bit microprocessor-based system with on-board EPROM and scratchpad RAM. It directly controls four 8-bit I/O ports, some of which are not used. As is the case in the PBX interface, the POTS interface is capable of controlling more than one line interface with a single microcontroller chip. For the discussions here, however, only a single line interface is described. Those skilled in the art will readily recognize how to duplicate the electrical configurations of FIGS. 4A–4B to create a multi-line POTS interface. Option switches may be added to unused parts to customize operation of the interface in the field.

A Mitel MT8880 DTMF transceiver 404 is used to receive and transmit DTMF dual tone pairs indicating the telephone number of the dialed extension and for signaling between the POTS PBX system and the voice mail system. The digital data lines D0–D3 forming the data bus from the Mitel transceiver chip 404 are connected to ports P1.0–P1.3 of the microcontroller chip 410. The other control lines are connected as shown in FIGS. 4A–4C. The implementation for the POTS interface shown in FIGS. 4A–4C is constructed only to transmit and receive DTMF tone pairs. However, those skilled in the art, using the teachings of the DID PBX interface 100 of FIGS. 3A–3C, will readily recognize how to convert the POTS PBX interface 200 to recognize pulse dial signaling.

The DTMF tone pairs transmitted to the voice mail system from the DTMF transceiver 404 are buffered through operational amplifier 408 through isolation transformer T2 onto the POTS PBX system through relay contacts K6A and K6B. The Zener diodes shown connected to the output of operational amplifier 408 are used for overvoltage protection and back EMF protection.

The control structure of relay control circuits K4, K5 and K6 of FIG. 4C are similar to the control structure for the DID PBX interface. Dedicated ports on the microcontroller are connected through the D-type latch circuit 411 (part No. 74CH373 available from Texas Instruments and other vendors) to the relay control circuits through the inverter buffers as shown in FIG. 4C.

Figure 5:
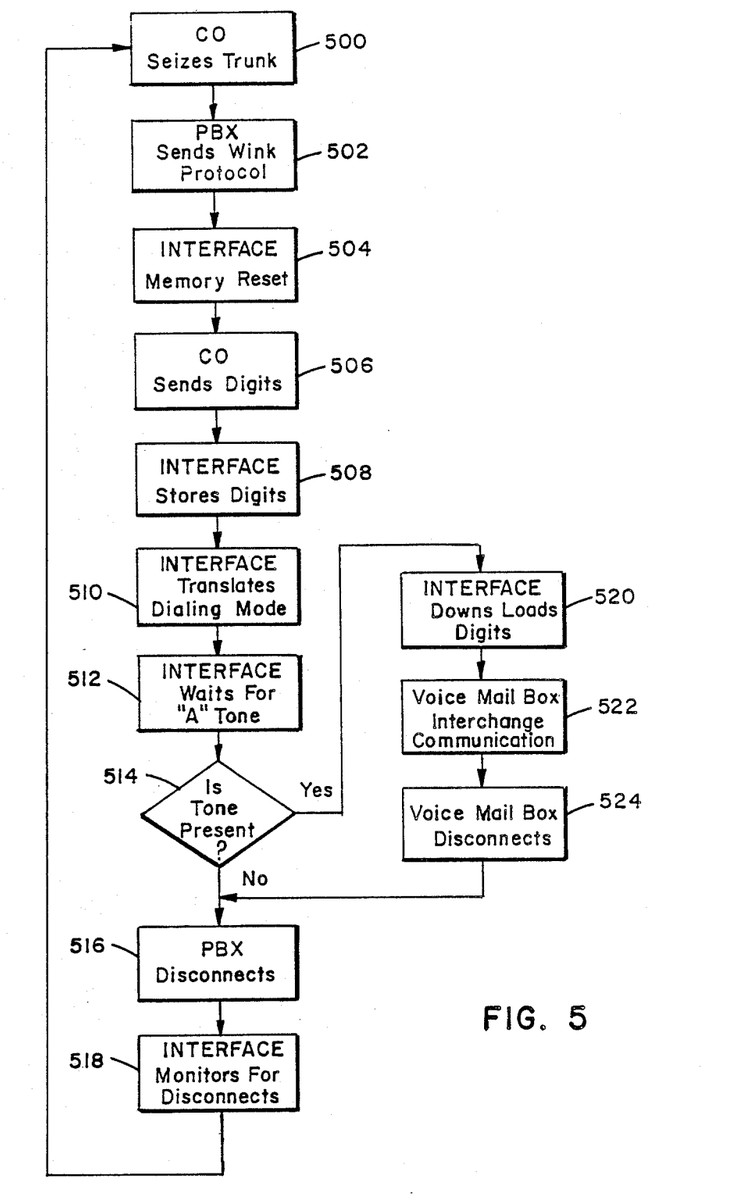
FIG. 5 is a control flowchart for the DID PBX Interface System.

The software control program contained in the EPROM program memory of microcontroller chip 310 for the DID PBX interface 100 is shown in FIG. 5. Those skilled in the art will readily recognize the translation of this control sequence into the appropriate microprocessor control commands necessary to operate the DID PBX interface 100.

Beginning at command box 500, the central office seizes the trunk by placing a termination impedance across the DID line, indicating that a call is to be forwarded to the PBX. At command box 502, the DID PBX system detects the current through the tip and ring wires caused by the termination impedance and sends the wink protocol to the central office, indicating the DID PBX system is ready to receive the extension of the called party. This wink is comprised of an approximate 200-millisecond voltage reversal between the tip and ring wires of the DID trunk. The DID PBX interface 100 recognizes the wink in command box 504 and uses this to reset the memory of the microcontroller and readies the interface for receiving the extension digits.

After an approximately 30-millisecond wait period after the termination of the wink protocol, the central office sends the digits corresponding to the extension of the dialed party down the DID trunk, as shown in command box 506. The DID PBX system receives these digits, and at the same time the DID PBX interface 100 stores the digits in the microcontroller memory as shown in box 508. Whether these digits were transmitted from the central office in pulse dial mode or in DTMF mode, the PBX interface translates the dialing mode to a binary form for storage in the microcontroller at 510. The DID PBX interface 100 then waits for a command from the voice mail system to download the stored digits. This command in the preferred embodiment of the present invention is an "A" tone in the DTMF repertoire. The A through D tones of the DTMF tone pair family are not used by the central office switching equipment, and thus do not interfere with any ongoing control or signaling. In this case, the "A" tone would be transmitted by the voice mail system for receipt by the DID PBX interface 100 to download the digits.

Decision box 514 indicates that the PBX inter face will wait for the "A" tone to download the digits or wait for a PBX disconnect to reset the system. If a tone is indicated, control is passed to command box 520 and the DID PBX interface downloads the digits via DTMF tone pairs to the voice mail system. The voice mail system will then optionally indicate at command box 522 that the digits were received properly. This could be by, for example, transmitting a DTMF "B" tone pair. After the voice mail conversation, control is then passed to the command box 524 where the voice mail box disconnects the telephone call, indicating that the DID PBX system should also disconnect. Control is then passed to box 516 where it is merged with the control path from decision box 514 where regardless of the source of disconnect, the DID PBX system will disconnect at command box 516. Command box 518 indicates that the PBX interface will monitor for a disconnect to restart the control program.

Figure 6:
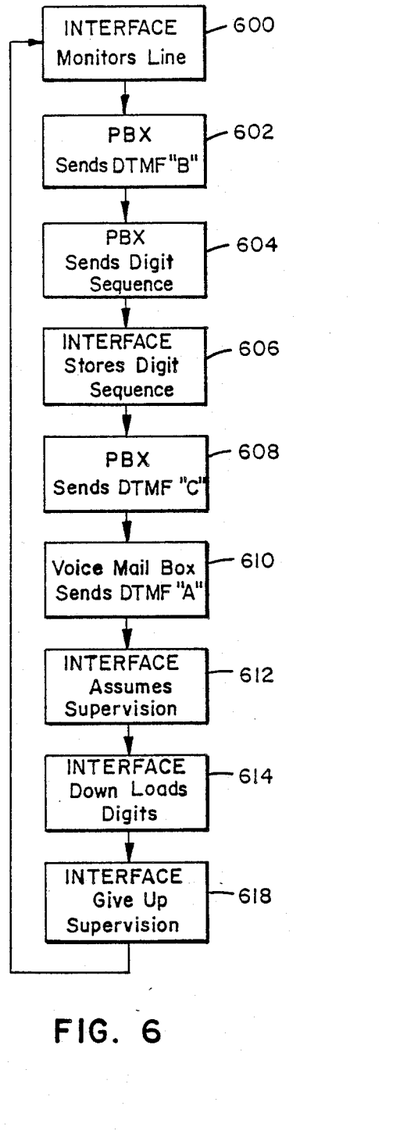
FIG. 6 is a control flowchart for the POTS PBX Interface System.

The software control flow chart for the POTS PBX interface 200 is shown in FIG. 6. Those skilled in the art will readily recognize the task of converting this control flow into the appropriate machine language level commands for programming the microcontroller chip 410 for controlling the POTS PBX interface 200.

Control flow starts at command box 600 where the POTS PBX interface 200 merely monitors the line for requests from either the POTS PBX system or the voice mail box. At command box 602, the POTS PBX system upon receiving a telephone call along the central office trunk line will send a DTMF "B" tone pair to the POTS PBX interface 200 indicating that it is ready to transmit the extension of the called party. The POTS PBX system then sends the digit sequence via DTMF tone pairs at command box 604. The POTS PBX interface 200 will store the digit sequence in the scratchpad RAM memory of the microcontroller for later downloading to the voice mail system at command box 606. An optional termination handshaking command (DTMF "C") at command box 608 is transmitted by the POTS PBX system to indicate the end of the digit sequence at command box 608. The POTS PBX interface 200 then waits for another command to download the digit sequence. This command is shown in command box 610 where the voice mail box sends a DTMF "A" tone pair requesting the downloading of the digit sequence corresponding to the dialed extension. The POTS PBX interface 200 then assumes supervision 612 of the telephone line between the central office and the POTS PBX system by opening the network interface relay contacts K5A and K5B, closing the termination impedance relay contacts K4A and K4B and closing the voltage source and transmit interface relay contacts K6A and K6B. In this fashion, the central office telephone line is still terminated, and a talk battery is placed on the POTS PBX system line even though the central office and the POTS PBX system are disconnected.

At this point, the POTS PBX interface 200 downloads the digits via DTMF tone pairs to the voice mail system as shown in command box 614. After the digits have been transmitted, the POTS PBX interface 200 gives up supervision of the line at command box 618 by removing the voltage source, transmit interface, and termination impedance from the telephone line and by cutting through the central office to the POTS PBX system via the K5A and K5B relay contacts. The microcontroller program then resets to command box 600 for monitoring the interface for further commands.

During transmission of the telephone extension from the POTS PBX system to the POTS PBX interface 200, the caller connected through the central office is able to hear the DTMF tones being transmitted due to the relay contacts K5A and K5B being closed. This is one available embodiment. An alternate embodiment would be to connect the DTMF transceiver on the POTS PBX system side of the relay interface to prevent the caller from hearing these tones. In the preferred embodiment of the present invention, the POTS PBX interface 200 allows these tones to be heard by the caller as a method of assuring the caller that the line has not been dropped.

While the present invention has been described in connection with the preferred embodiment thereof, it will be understood that many modifications will be readily apparent to those of ordinary skill in the art, and this application is intended to cover any adaptations or variations thereof. Therefore, it is manifestly intended that this invention be limited only by the claims and the equivalents thereof.

What is claimed is:

1. A POTS-to-PBX interface comprising:
   first connection means for connecting to a POTS (Plain Old Telephone Surface) telephone line;
   second connection means for connecting to a PBX (private branch exchange) telephone line;
   a network separation relay connected between said first connection means and said second connection means;
   a termination impedance selectively connected to said first connection means;
   a battery source selectively connected to said second connection means;
   a receiver connected to said first connection means;
   a transmitter connected to said second connection means; and
   control means connected to said network separation relay, said termination impedance, said battery source, said receiver and said transmitter for performing the steps of:
   (a) receiving a telephone number of a called party from the PBX through the receiver;
   (b) storing in memory the digits of the received telephone number;
   (c) monitoring the second connection means for a request to transmit the stored telephone number;
   (d) receiving a request to transmit the stored telephone number;
   (e) opening the network separation relay and simultaneously connecting the termination impedance to the first connection means and connecting the battery source to the second connection means;
   (f) transmitting the stored telephone number; and
   (g) closing the network separation relay and simultaneously disconnecting the battery source from the second connection means and the termination impedance from the first connection means.

* * * * *